United States Patent [19]

Han et al.

[11] Patent Number: 6,136,929
[45] Date of Patent: Oct. 24, 2000

[54] POLYARYLENE ETHER FOR OPTICAL COMMUNICATION

[75] Inventors: Kwan-soo Han, Seoul; Woo-hyuk Jang, Yongin; Eun-ji Kim, Seoul; Tae-hyung Rhee, Sungnam, all of Rep. of Korea

[73] Assignee: SamSung Electronics Co., Ltd., Suwon, Rep. of Korea

[21] Appl. No.: 09/148,695

[22] Filed: Sep. 4, 1998

[30] Foreign Application Priority Data

Sep. 4, 1997 [KR] Rep. of Korea ...................... 97-45811

[51] Int. Cl.[7] .......................... C08F 283/08; C08G 65/42
[52] U.S. Cl. .......................... 525/534; 525/535; 525/537; 528/397; 528/401
[58] Field of Search ...................................... 525/534, 535, 525/537; 528/397, 401

[56] References Cited

U.S. PATENT DOCUMENTS

| | | |
|---|---|---|
| 5,114,780 | 5/1992 | Mercer et al. . |
| 5,115,082 | 5/1992 | Mercer et al. . |
| 5,155,175 | 10/1992 | Mercer et al. . |
| 5,173,542 | 12/1992 | Lau et al. . |

FOREIGN PATENT DOCUMENTS

| | | |
|---|---|---|
| 0 149 359 | 7/1985 | European Pat. Off. . |
| 0 758 664 A1 | 2/1997 | European Pat. Off. . |
| 4836439 | 11/1973 | Japan . |
| 5502257 | 4/1993 | Japan . |
| 5503112 | 5/1993 | Japan . |
| 5506042 | 9/1993 | Japan . |
| WO 91/16370 | 10/1991 | WIPO . |
| WO 97/01593 | 1/1997 | WIPO . |

OTHER PUBLICATIONS

Chem Abstract: 130:96496 Crosslinkable Fluorinated Poly(arylene ethers) w/High Transparency and HighThermal Stability Have Been Investigated for Low–Loss Optical Waveguide Materials "Lee et al".
129: 331473 Discloses Characterization of Chloro–Fluorinated Poly(arylene ethers) for Optical Waveguide Application "Han et al".
121:84111 Synthesis and Characterization of New Poly(arylene Ethers) With Low Dielectric Content "Mercer et al".
119: 250919 Discloses Dielectric Content Fluorinated Aryl Ethers Prepared From Decafluorobiphenyl "Mercer et al".
117: 70430 Synthesis and Characterization of Fluorinated Aryl Ethers Prepared From Decafluorobiphenyl "Mercer et al".
Letter from Gwendolyn Maxwell of John Wiley & Sons Inc., dated Sep. 17, 1999, giving expected publication date of Journal of Polymer Science, vol. 36, Issue 16 Part A (approximately Oct. 9, 1998).
Internet download with heading "Springer Polymer Bulletin", downloaded on Sep. 16, 1999, giving online publication date of article by Kwansoo Han, Donog Hack Suh and Tae Hyung Rhee entitled "Characterization of Choloro–Fluorinated poly(arylene ether)s for Optical Waveguide Application"; online publication: Dec. 9, 1998.
Letter from Young–Pil Lee, Y.P. Lee & Associates, Korea, indicating printed publication date of article by Kwansoo Han and Tae Hung Rhee (Dec. 9, 1998).
Kwansoon Han et al., *Polymer Bulletin*, 41, 455,461 (1998), corresponding to Chem Abstract 129:33/473; cited by the Examiner.
Hyung–Jong Lee et al., *Journal of Polymer Science: Part A: Polymer Chemistry*, 36, 2881–2887 (1998), corresponding to Chem Abstract: 130: 96496, cited by the Examiner.
Frank Mercer et al., *Polymer Material Sci Eng*, 66, 198–199 (1992), corresponding to Chem Abstract 119:250919, cited by the Examiner.
Frank Mercer et al., *Journal of Polymer Science: Part A: Polymer Chemistry*, 30, 1767–1770 (1992), corresponding to Chem Abstract 117: 70430, cited by the Examiner.
Frank Mercer et al., *ACS Symposium Series*, 537, Polymers for Microelectronics, 548–553, 1994, corresponding to Chem Abstract 121:84111, cited by the Examiner.
WPI Accession No. 92–154563 [30] & JP 4091127 (Hitachi).

*Primary Examiner*—Duc Truong
*Attorney, Agent, or Firm*—Robert E. Bushnell, Esq.

[57] ABSTRACT

Polyarylene ether for optical communications, expressed by the formula 1:

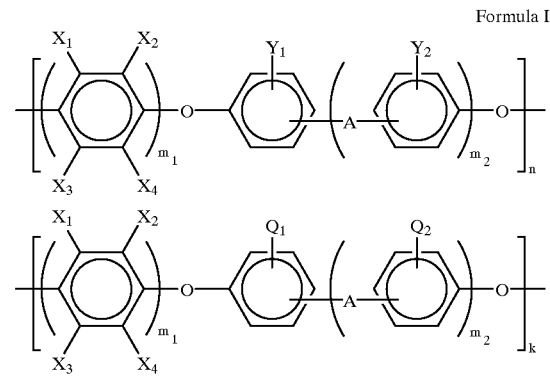

The polyarylene ether has excellent resistance to heat and film processing properties and the light absorption loss in the wavelength range for optical communications is low. Also, by controlling the copolymerization ratio of a monomer whose hydrogen of C—H bond is substituted by F and a monomer whose hydrogen of C—H bond is substituted by Cl, the refractive index of the polymer can be adjusted to a level suitable for an optical material used for optical communications.

14 Claims, No Drawings

POLYARYLENE ETHER FOR OPTICAL COMMUNICATION

CLAIM OF PRIORITY

This application makes reference to, incorporates the same herein, and claims all benefits accruing under 35 U.S.C §119 from an application entitled Polyarylene Ether For Optical Communication earlier filed in the Korean Industrial Property Office on Sep. 4, 1997, and there duly assigned Serial No. 97-45811 by that Office.

BACKGROUND OF THE INVENTION

1. Field of the Invention

The present invention relates to polyarylene ether for optical communications, and more particularly, to polyarylene ether used for manufacturing an optical communication device.

2. Description of the Related Art

A range of light wavelengths for optical communications has been shifted from 800 nm to 1,550 nm belonging to the wavelengths of near infrared light. Thus, it is ideal to manufacture an optical communication device using a material which barely absorbs light belonging to the wavelengths of near infrared light.

In general, a polymer is used for an optical substrate such as an optical lens or compact disk. Recently, research into use of such polymer as a material for an optical waveguide for light transfer in the near infrared range is being conducted.

However, a general polymer absorbs light of 1,000~1,700 nm in the near infrared range. Such absorption of near infrared light by the polymer is caused by overtone of harmonics according to stretching and deformation vibrations of carbon and hydrogen bond (C—H) in alkyl, phenyl and other similar functional groups. Thus, using the polymer as a material for an optical waveguide utilizing light in the near infrared range results in a large loss in light transfer. In order to reduce loss in light transfer, the light absorption wavelength of the polymer should be shifted from the wavelength region of the near infrared light to a longer or shorter wavelength region. To this end, a method for substituting hydrogen of the carbon and hydrogen (C—H) bond by fluoride (F) or heavy hydrogen (D) has been suggested.

In particular, the method for substituting the hydrogen of C—H bond by D is not suitable for a material for an optical communications device utilizing the light of 1,500 nm because the material having carbon and heavy hydrogen (C—D) bond absorbs much light of 1,500 nm. On the other hand, the method for substituting the hydrogen by F can minimize loss in light absorption at a wavelength of 1,000~1,700 nm.

Also, an optical material for manufacturing an optical device such as an opto-electronic integrated circuit (OEIC), an opto-electrical mixed wiring board (OEMWB), a hybrid integration device, a plastic optical fiber or a multi-chip module (MCM) requires thermal stability at 250° C. lasting at least for 30 minutes. Because such thermal resistance of the optical material is very important, glass transition temperature, thermal decomposition temperature, thermal expansion coefficient and double refractive index of the optical material should be carefully considered.

A polyimide is widely known as a polymer having good thermal resistance. Because the polyimide has a resistance to heat at a high temperature, e.g., approximately 400° C., great efforts are being made to utilize polyimide as a material for optical communications.

However, in general, polyimide has many C—H bonds within its molecule, loss in absorption of light is great at the near infrared region. To solve this problem, a polyimide whose hydrogen of C—H bond is partially or completely substituted for fluorine (F) has been reported. The polyimide whose hydrogen is partially replaced by F shows loss in light absorption of approximately 0.1 dB/cm at 1,310 nm, and the polyimide whose hydrogen is completely substituted by F barely shows loss in light absorption at 1,310 nm and 1,550 nm.

However, when substituting the hydrogen of C—H bond of polyimide by F as described above, the refractive index of the polyimide decreases. Here, the content of F in the polyimide is proportional to the decreased level of the refractivity index. Thus, because the polyimide whose hydrogen of C—H bond is replaced by F, i.e., fluorinated polyimide, has a low reflective index, the range of selection of a material capable of being used for cladding becomes narrow when the fluorinated polyimide is used as a material for the core of an optical fiber.

Also, the higher the fluoride content in the polyimide is, the lower the surface tension of the polymer is. Thus, it is difficult to coat such polymer on a substrate and a film formed of such polymer shows poor adhesion properties. As a result, film characteristics are lowered and the film is easily broken. Thus, actually, it is difficult to use the polyimide as a material for optical waveguiding.

Recently, poly(arylene ether) has been synthesized, which is a polymer having thermal resistance at a high temperature of approximately 400° C. This polymer has excellent film processing characteristics and small dielectric constant and double refractive index. Due to such characteristics of polyarylene ether, the polyarylene ether is expected as a suitable material for a dielectric thin film required for manufacturing a semiconductor device.

SUMMARY OF THE INVENTION

It is an objective of the present invention to provide polyarylene ether for optical communications, which minimizes loss in light absorption at a wavelength of 600~1,700 nm for optical communications, and has improved properties in thermal resistance, refractive index and film processing characteristics.

To achieve the objective, there is provided polyarylene ether for optical communications represented by the formula 1:

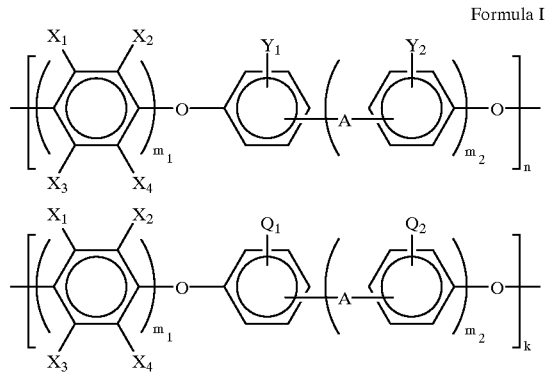

Formula I wherein $X_1$, $X_2$, $X_3$ and $X_4$, are independently selected from the group consisting of hydrogen, fluoride, chloride, $Y_1$ and $Y_2$ are independently hydrogen or fluorine, $Q_1$ and $Q_2$ are independently hydrogen or chloride, A is selected from the group consisting of —O—, —S—, —P(OR)—, —(CF$_2$)$_l$—, —CO— and —SO$_2$— (where R is trifluoromethyl (CF$_3$), trichloromethyl (CCl$_3$), pentafluorophenyl or pentachlorophenyl, and l is integer of 1~8), m$_1$ is 1 or 2, m$_2$ is 0, 1 or 2, $0 \leq n \leq 1$, and $0 \leq k \leq 1$ (where n and k represent mole fraction, and n+k=1).

In the chemical formula (1), n and k are determined by nuclear magnetic resonance analysis (NMR) and elemental analysis.

Preferably, the number average molecular weight of the polyarylene ether is $1 \times 10^4 \sim 1.2 \times 10^5$, the thermal decomposition temperature thereof is 450~550° C., and the glass transition temperature thereof is 180~200° C.

DESCRIPTION OF THE PREFERRED EMBODIMENTS

Polyarylene ether whose hydrogen of C—H bond is partially or completely replaced by fluoride (F) has a relatively low refractive index, and polyarylene ether whose hydrogen of C—H bond is partially or completely substituted by chloride (Cl) is a higher refractive index than the polyarylene ether having substituted F. Accordingly, the present invention is characterized in that a copolymerization ratio of a monomer whose hydrogen of C—H bond is substituted by F and a monomer whose hydrogen of C—H bond is substituted by Cl is properly controlled to result in polyarylene ether having a suitable refractive index characteristic for an optical waveguiding and whose loss in light absorption at the wavelength for optical communications is minimized.

The polyarylene ether of the present invention, as shown in the following structural formula thereof, includes parts B, Z1 and Z2. Here, the part B has a structure including an unsubstituted

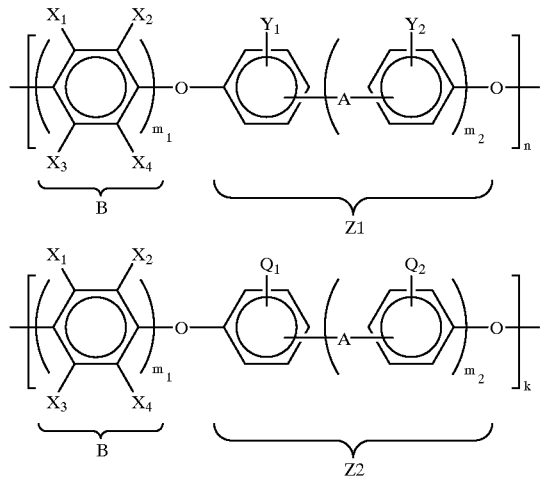

aromatic ring, an aromatic ring substituted with Cl or F, or repetitive units of those aromatic rings. The part Z1 has a structure including an unsubstituted aromatic ring, an aromatic ring substituted with F, or repetitive units of those aromatic rings, and the part Z2 has a structure including an unsubstituted aromatic ring or an aromatic rings substituted with Cl, or repetitive units of those aromatic rings.

Hereinafter, a method for preparing polyarylene ether represented by the formula 1 according to the present invention will be described.

First, an aromatic compound for forming the part B of the chemical formula (1), and an aromatic diol compound for forming the parts Z1 and Z2 are dissolved in a solvent, e.g., diethylacetamide, and a base is mixed with the solution. The resultant is reacted at −20~120° C. for 5~300 hours. After the reaction is completed, a non-reacted base is removed from the reaction mixture. Then, the reaction mixture is mixed with distilled water or organic solvent, e.g., ethyl alcohol, to form a precipitate. and the precipitate is dried, resulting in polyarylene ether of the formula 1.

A compound for forming the part B includes hexafluorobenzene, hexachlorobenzene, decafluorobiphenyl or decachlorobiphenyl, and a compound for the part Z1 includes 4,4'-(hexafluoroisopropylidene)diphenol. Also, a compound for forming the part Z2 includes 4,6-dichlororesorcinol. The polyarylene ether obtained by the above method has a number average molecular weight of $1 \times 10^4 \sim 1.2 \times 10^5$, a thermal decomposition temperature of 450~550° C., and a glass transition temperature of 180~200° C. The polyarylene ether is used as material for an optical communications device in a wavelength of 600~1,700 nm.

Hereinafter, the present invention will be described through the following examples. However, the present invention is not limited to the following examples.

EXAMPLE 1

Preparation of polyarylene ether represented by formula 2

0.023 mol of decafluorobiphenyl and 0.022 mol of 4,4'-(hexafluoroisopropylidene)diphenol were dissolved in 120 ml of N,N-dimethylacetamide. Then, 0.02625 mol of potassium carbonate (K$_2$CO$_3$) was added to the solution and reacted at 80° C. for 24 hours. After the reaction was completed, excess potassium carbonate was removed from the reaction product. Then, the reaction mixture was mixed with distilled water to form a precipitate. The precipitate was dried, resulting in polyarylene ether represented by the formula 2, having a number average molecular weight of $4 \times 10^4$.

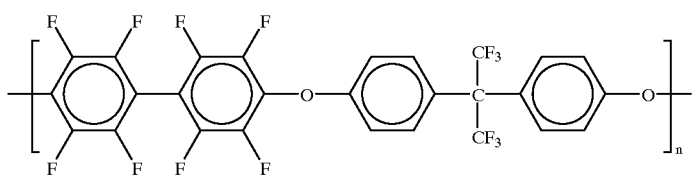

Formula 2

EXAMPLE 2

Preparation of polyarylene ether represented by the formula 3

0.03 mol of decafluorobiphenyl, 0.026 mol of 4,4'-(hexafluoroisopropylidene)diphenol and 0.0029 mol of 4,6-dichlororesorcinol were dissolved in 250 ml of N,N-dimethylacetamide. Then, 0.048 mol of potassium carbonate ($K_2CO_3$) was added to the mixture and reacted at 80° C. for 24 hours. After the reaction was completed, excess potassium carbonate was removed from the reaction mixture. Then, the reaction mixture was mixed with distilled water to form a precipitate. The precipitate was dried, resulting in polyarylene ether represented by the formula 3, having a number average molecular weight of $4 \times 10^4$.

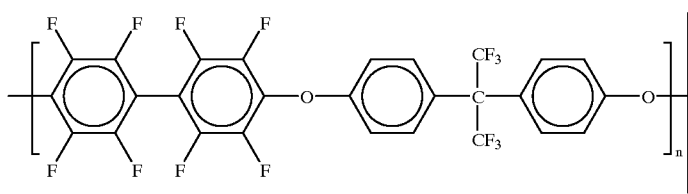

Formula 3

In the chemical formula 3, n is 0.9 and k is 0.1.

EXAMPLE 3

Preparation of an optical waveguide device

First, polyarylene ether represented by Formula 2 was coated on a silicon wafer to form a lower buffer layer. Also, polyarylene ether represented by Formula 3 was coated on the lower layer to form a core layer. Subsequently, a masking pattern was formed on the core layer through photolithography. The predetermined portion of the core layer was etched using the masking pattern to form an optical waveguide, and then the masking pattern was eliminated. Then, polyarylene ether represented by Formula 2 was coated on the resultant to form an upper buffer layer, thus completing the optical waveguide device.

Thermal decomposition temperatures of the polyarylene ether represented by the formulas 2 and 3, obtained by Examples 1 and 2, respectively, were measured. The thermal decomposition temperature of the polyarylene ether of the formula 2 was 520° C., and that of polyarylene ether of the formula 3 was 524° C., which was improved compared to a conventional material for optical communication.

The refractive indexes of the polyarylene ether of the formulas 2 were measured, and the results are tabulated in Table 1.

| classification | refractive index | |
|---|---|---|
| | at 1,300 nm | at 1,550 nm |
| Example 1 | 1.4935 ± 0.0005 | 1.4914 ± 0.0005 |
| Example 2 | 1.4986 ± 0.0005 | 1.4965 ± 0.0005 |

As seen from Table 1, the polyarylen ether of Example 1 has a relatively low refractive index compared to that of polyarylen ether of Example 2. This is because the polyarylen ether prepared by the method of Example 2 contains more chloride and less fluoride than the polyarylen ether of Example 1.

As the above-described, the polyarylene ether of the present invention exhibits high thermal resistance, has good film processing characteristics and the light absorption loss in the wavelength range for optical communications is low. Also, by controlling the copolymerization ratio of a monomer whose hydrogen of C—H bond is substituted by F and a monomer whose hydrogen of C—H bond is substituted by Cl, the refractive index of the polymer can be adjusted to a level suitable for a material used for optical communications.

The polyarylene ether according to the present invention can be used as an essential optical material for an optical communications device such as an opto-electric integrated circuit (OEIC), opto-electrical mixed wiring board (OEMWB), multi-chip module (MCM) and plastic optical fiber.

What is claimed is:

1. An optical communications device, comprising:

an essential optical material, said material comprising a copolymer comprising different repeating subunits represented by the formulas:

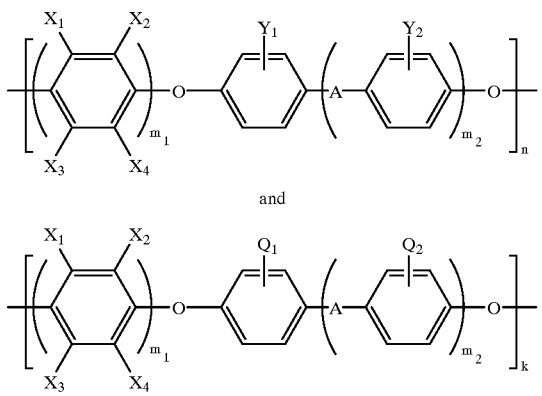

and where $X_1$, $X_2$, $X_3$ and $X_4$ are each independently selected from the group consisting of hydrogen, fluorine and chlorine; $Y_1$ and $Y_2$ are independently hydrogen or fluorine; $Q_1$ and $Q_2$ are independently hydrogen or chlorine; A is selected from the group consisting of —O—, —S—, —P(OR)—, —(CF$_2$)$_l$—, —C(CF$_3$)$_2$—, —CO—, and —SO$_2$—; where R is selected from the group consisting of trifluoromethyl, trichloromethyl, pentafluorophenyl and pentachlorophenyl; l is an integer in the range of 1 to 8; $m_1$ is 1 or 2; $m_2$ is 0, 1 or 2; and n and k represent mole fractions of the repeating subunits, with $0 \leq n \leq 1$, and n+k=1.

2. The device of claim 1, further comprising:
said copolymer having an average molecular weight in the range of approximately $1 \times 10^4$ and $1.2 \times 10^5$.

3. The device of claim 1, further comprising:
said copolymer having a thermal decomposition temperature in the range of approximately 450 to 550° C.

4. The device of claim 1, further comprising:
said copolymer having a glass transition temperature in the range of approximately 180 to 200° C.

5. The device of claim 1, further comprising:
an opto-electric integrated circuit, an opto-electrical mixed wiring board, a multi-chip module or an optical fiber comprising said optical material.

6. A method of making an optical device, comprising:
preparing a copolymer comprising different repeating subunits represented by the formulas:

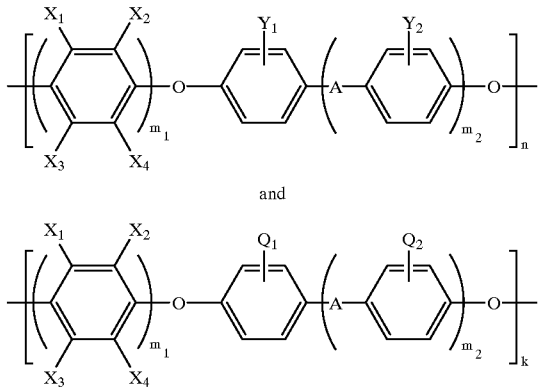

and where $X_1$, $X_2$, $X_3$ and $X_4$ are each independently selected from the group consisting of hydrogen, fluorine and chlorine; $Y_1$ and $Y_2$ are independently hydrogen or fluorine; $Q_1$ and $Q_2$ are independently hydrogen or chlorine; A is selected from the group consisting of —O—, —S—, —P(OR)—, —C(CF$_2$)$_l$—, —C(CF$_3$)$_2$—, —CO—, and —SO$_2$—, where l is an integer in the range of 1 to 8; $m_1$ is 1 or 2; $m_2$ is 0, 1 or 2; and n and k represent mole fractions of the repeating subunits, with $0 \leq n \leq 1$, and n+k=1; and forming said copolymer into an optical element of the optical device.

7. The method of claim 6, said copolymer-preparing step further comprising the steps of:

selecting a first and a second aromatic compound from the group consisting of hexafluorobenzene, hexachlorobenzene, decafluorobiphenyl and decachlorobiphenyl; and allowing said first and second aromatic compounds to react with 4,4'-(hexafluoroisopropylidene)diphenol and 4,6-dichlororesorcinol in dimethylacetamide.

8. The method of claim 7, said preparing step comprising:

selecting a first aromatic compound and a second aromatic compound which are each a substituted benzene or polyphenyl with at least 2 chlorine or fluorine substituents.

9. The method of claim 7, said preparing step further comprising:

said first aromatic diol being a benzene diol, a polyphenyl diol, or a fluorine-substituted benzene diol or polyphenyl diol.

10. The method of claim 7, said preparing step further comprising:

said second aromatic diol being a benzene diol, a polyphenyl diol, or a chlorine-substituted benzene diol or polyphenyl diol.

11. The method of claim 7, said preparing step further comprising:

adding a base to the reaction mixture and allowing to react in the range of approximately 20 to 120° C. for in the range of approximately 5 to 300 hours.

12. The method of claim 7, said preparing step further comprising:

removing the excess base;

adding distilled water or ethyl alcohol to the reaction mixture to precipitate a polymer; and drying the precipitate.

13. The method of claim 6, said preparing step further comprising that:

$Q_1$ is selected to be fluorine or A is a group comprising fluorine;

$Q_2$ is selected to be chlorine and if A comprises fluorine, then $m_2$ is selected to be 0; and the copolymerization values of n and k are selected to produce a polymer which has a desired value of refractive index.

14. The method of claim 6, said step of forming an element further comprising:

said device being an opto-electric integrated circuit, an opto-electrical mixed wiring board, a multi-chip module or an optical fiber.

* * * * *